United States Patent [19]
Caron

[11] Patent Number: 4,632,373
[45] Date of Patent: Dec. 30, 1986

[54] FIXTURE

[75] Inventor: Roland G. Caron, Brookfield, Conn.

[73] Assignee: Branson Ultrasonics Corporation, Danbury, Conn.

[21] Appl. No.: 811,255

[22] Filed: Dec. 20, 1985

[51] Int. Cl.⁴ .......................... B29C 27/08; B23Q 1/00
[52] U.S. Cl. ........................................ 269/50; 269/52; 156/73.5
[58] Field of Search .................. 156/73.5; 228/112, 2; 403/31, 34, 39; 408/17; 269/47, 49–52, 20, 309–310, 224, 203

[56] References Cited

U.S. PATENT DOCUMENTS

| | | | |
|---|---|---|---|
| 2,894,740 | 7/1959 | Emerson et al. | 403/31 |
| 4,377,428 | 3/1983 | Toth | 156/73.5 |
| 4,500,079 | 2/1985 | Morghen | 269/47 |
| 4,557,623 | 12/1985 | Tella | 403/31 |

*Primary Examiner*—Robert C. Watson
*Attorney, Agent, or Firm*—Philip J. Feig; Ervin B. Steinberg

[57] ABSTRACT

A fixture for use in conjunction with welding workpieces by vibration welding including a pin adapted to assume two states, namely a first state in which the pin is movable to seek an aperture in the workpiece and is free to enter such aperture, and a second state in which the pin is rigidly fixed. The pin is attached to a plate which responsive to fluid pressure is either free to float in a generally lateral direction, or is clamped rigidly between two superposed plates.

8 Claims, 6 Drawing Figures

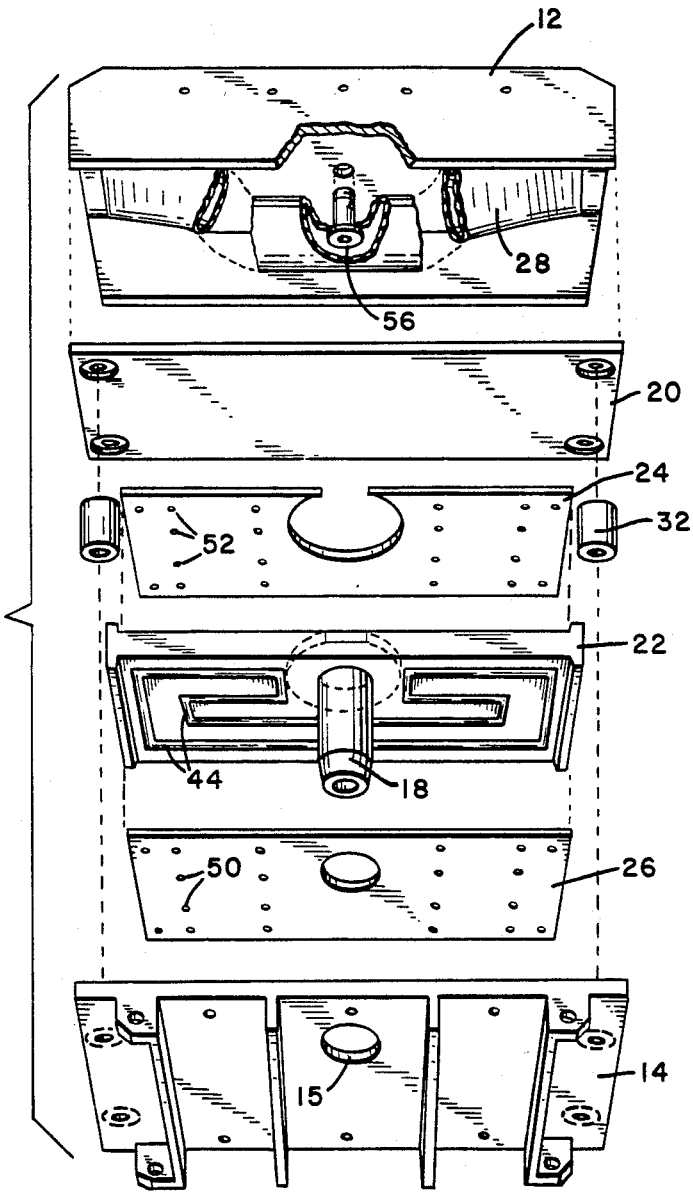

4,632,373

FIXTURE

SUMMARY OF THE INVENTION

This invention refers to a mechanical fixture and more particularly refers to a mechanical fixture for engaging a workpiece and holding such workpiece during assembly. Quite specifically, this invention refers to a fixture for engaging and retaining a workpiece during linear friction welding.

U.S. Pat. No. 4,377,428 dated Mar. 22, 1983, issued to Leslie Toth and entitled "Method of Friction Welding" describes a method for assembling two thermoplastic workpieces by linear friction welding. The patent quite specifically discloses the assembly of a plastic automobile bumper comprising a U-shaped workpiece into which a second workpiece in the form of a flat reinforcing plate is inserted and then both workpieces are united by linear friction welding for providing a fusion weld along the two lengthwise edges of the reinforcing plate. In order to accomplish such welding, the U-shaped workpiece is held stationary while the plate is subjected to reciprocating translating motion. During this process, the plate must be securely fastened to the vibratory mechanism which provides this motion.

It has been found that vacuum fastening means alone are insufficient to provide a secure attachment of the plate to the vibratory mechanism. One other attachment method comprises the provision of an aperture in the plate and a coupling pin extending from the vibratory mechanism for engaging the aperture, see the patent supra. It will be apparent that the pin must tightly fit into the aperture in order to cause the plate to be securely coupled, without play, to the vibratory mechanism. When manufacturing large plates by a molding process, it is difficult to obtain the apertures with a high degree of accuracy due to the uneven shrinking of the plastic material, changes of the chemical composition of the plastic material, or warping of the molded plates during cooling. Therefore, it has been necessary to drill the aperture on each plate after molding and just prior to the welding process, using accurate locating fixtures.

The present invention overcomes this heretofore experienced problem by providing a fixture having a floating coupling means, such as a pin, which seeks the aperture in the plate and comes to an engagement with the aperture. When the pin engages the aperture, the fixture is pressurized by a suitable fluid, such as air, to cause the pin to be held fixed in the assumed position, thereby tightly engaging the plate or any other suitable workpiece. In this manner, the pin can adapt itself, within limits, to positional variations of the aperture in the plate.

One of the principal objects of this invention, therefore, is the provision of a new and improved fixturing means for vibration welding.

Another important object of this invention is the provision of a fixture in which a coupling means, such as a pin, is adapted to float for seeking a predetermined engagement with a workpiece and responsive to such engagement the pin can be fixed in such position.

A further important object of this invention is the provision of a fixture adapted for use in a friction welding apparatus wherein large plastic parts are welded.

Further and still other objects of this invention will become more clearly apparent by reference to the following description when taken in conjunction with the accompanying drawings.

BRIEF DESCRIPTION OF DRAWINGS

FIG. 2 is an exploded view of the fixture revealing the internal assembly;

DETAILED DESCRIPTION OF THE INVENTION

Figure 1:
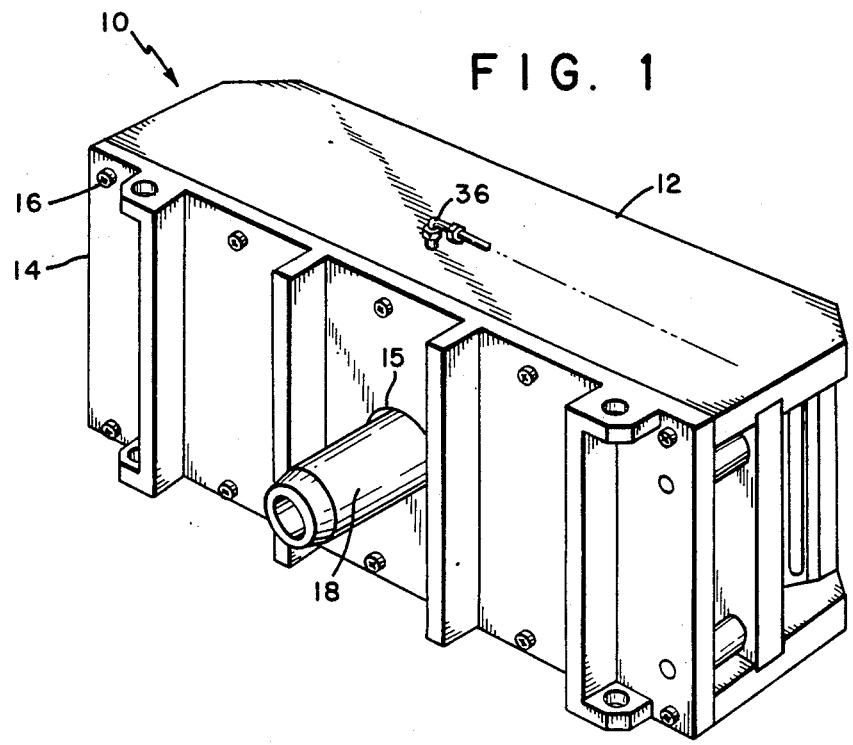
FIG. 1 is a perspective view of the fixture forming the present invention.
Figure 6:
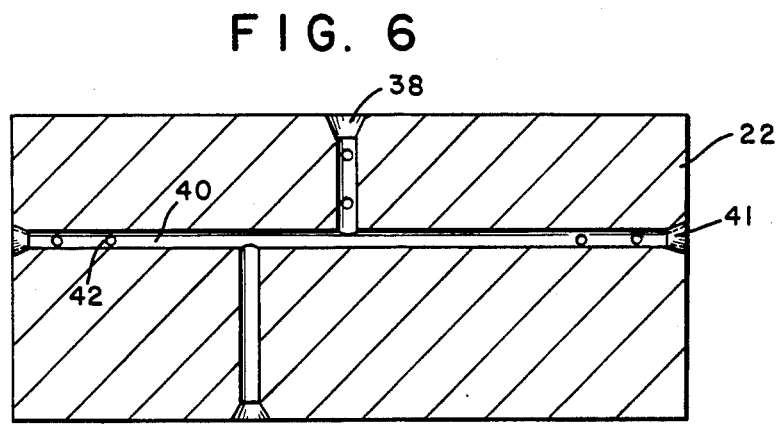
FIG. 6 is a sectional view along line 6—6 in FIG. 5.

Referring now to the figures and FIG. 1 in particular, there is shown the fixture 10 comprising a housing 12 and a cover plate 14 fastened thereto by suitable screw means 16. A coupling means 18 in the form of a cylindrical pin extends from the cover plate 14 through an aperture 15 in the cover plate and is adapted to engage the aperture in a workpiece abutting against the underside of the cover plate 14. The coupling means 18 is capable of assuming two states, namely a movable state in which the pin 18 is adapted to move a limited amount for centering itself in the circular aperture of the workpiece and a second state in which the pin is rigidly positioned, without ability to move, in the aperture of the workpiece. In order to accommodate the first state, the aperture 15 in the cover plate 14 is somewhat larger than the diameter of the pin 18. Moreover, for the purpose of entering the aperture in the workpiece and centering itself within the workpiece aperture, the front end of the pin 18 is slightly tapered as illustrated.

Referring now to FIGS. 2 through 6, the housing 12 and cover plate 14 attached thereto define a cavity within which there are disposed in superposed relation a first plate 20, a second plate 22, a first friction pad 24, a second friction pad 26, an inflatable bladder 28 and several other elements which will be described in connection with the aforementioned components. The friction pads 24 and 26 are bonded to the opposite side surfaces of the plate 22 by suitable adhesive means and are made of material such as is used in automobile brake linings.

Figure 3:
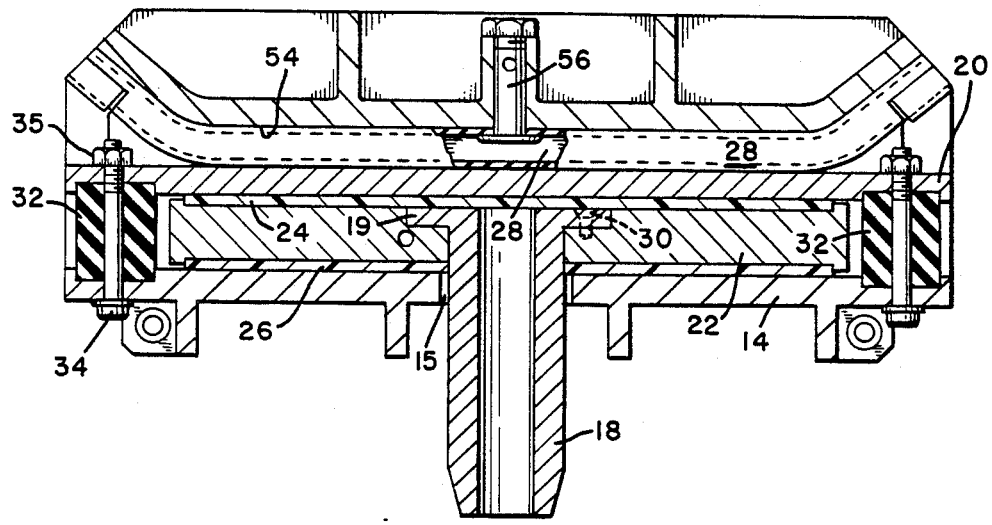
FIG. 3 is a sectional view of the assembled fixture.
Figure 4:
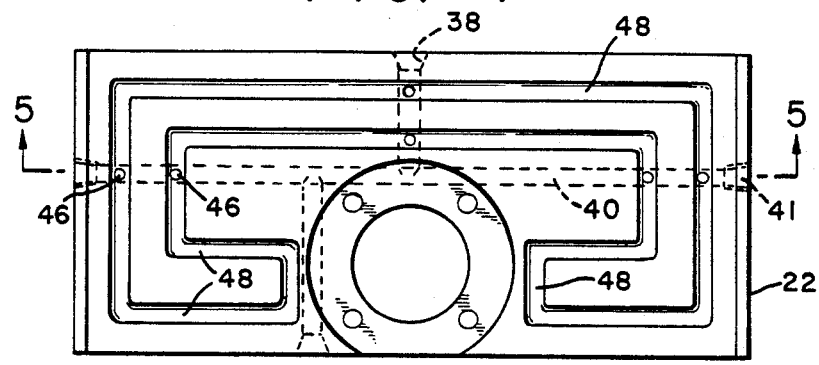
FIG. 4 is a plan view of the plate adapted to float responsive to fluid pressure with the coupling means removed.
Figure 5:
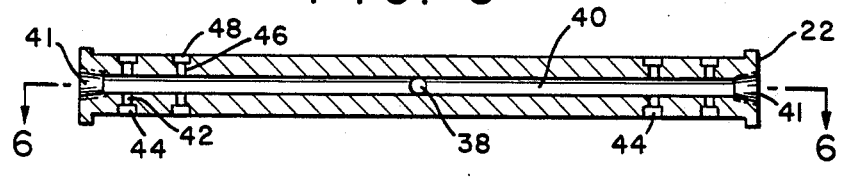
FIG. 5 is a sectional view along line 5—5 in FIG. 4.

The second plate 22 has secured thereto the pin 18 by means of a flanged end 19 forming a part of the pin and suitable screw means 30 fastening the pin 18 to the plate 22 for causing the plate 22 and pin 18 to move in a unitary manner. The plate 22 is dimensioned to be somewhat smaller than the plate 20 to enable the plate to undergo limited lateral motion in the horizontal plane, as seen in FIG. 3, for enabling the pin 18 to center itself in the aperture of the workpiece. At the same time the plate 22 also is capable of a small amount of vertical motion relative to the plate 20 and cover plate 14 by virtue of a set of resilient rubber spacers 32 disposed between the first plate 20 and the cover plate 14 utilizing suitable bolts 34 and threaded nuts 35. (The bolts and nuts are used during assembling of the fixture, but are removed after the fixture is completely assembled.) The gap between the first plate 20 and the cover plate 14 is adjusted such that this gap is slightly larger than the thickness of the second plate 22 with friction pads 24 and 26 attached thereto. The rubber spacers 32 also urge the plate 20 away from the plate 22 in order to provide such gap.

During the first state, the plate 22 is rendered floating by a cushion of fluid, such as gas or air, provided to either side of the plate 22 in order that the pin 18 is free to enter the aperture in the workpiece and is able to center itself relative to such aperture. Preferably air under pressure is admitted through a suitable fitting and port 38 in the plate 22, see FIGS. 1 and 4. The port 38 communicates with a horizontal cross bore 40 through the plate 22. The bore 40 is plugged at either end by a suitable plug 41. The cross bore 40 is connected via several bores 42 to a pattern of surface grooves 44 disposed on the underside of the plate 22, see FIG. 5. Conversely, a set of bores 46 communicate with a similar pattern of surface grooves 48 disposed on the upper side of the plate 22. In this manner, gas under pressure is brought to either side of the plate 22. A set of holes 50 in the friction pad 26, see FIG. 2, are aligned with the grooves 44 for admitting gas under pressure into the space between the plate 22 and the cover plate 14. Similarly, a set of holes 52 in the friction pad 24 are aligned with the set of grooves 48 of the plate 22, see FIG. 5, for providing gas under pressure in the space between the plate 22 and the first plate 20. As a result of a film or layer of gas under pressure at either side of the plate 22, the latter plate with pin 18 is attached thereto is adapted to "float" and move in a lateral direction for enabling the pin 18 to engage a workpiece in the desired predetermined relation.

In order to cause the coupling pin 18 to assume its second state, i.e., being rigidly positioned, the pressurized fluid disposed in the space between the plate 22 and cover plate 14 and between plate 22 and plate 20 is bled to ambient and the bladder 28 fastened to the wall 54 of the housing 12 is inflated by pressurized fluid, such as gas or air. The bladder is fastened to the housing wall by a suitable screw bolt 56, modified for serving also as a fluid port.

Upon inflating the bladder 28, in response to the pressure exerted by the bladder, the plate 20 is urged against the plate 22 which, in turn, is urged against the cover plate 14. The friction pads 26 and 24 prevent sliding motion of the plate 22 and pin 18. In this state, the resilient spacers 32 are compressed. Welding can now be accomplished since the pin 18 is rigidly held and coupled to the workpiece. Upon completion of welding the fluid pressure is released from the bladder and the resilient spacers 32 create the gap between the cover plate 14 and the plate 20 for admitting, for the next operating cycle, fluid pressure through the port 38.

While there has been described and illustrated a preferred embodiment of the invention, it will be apparent to those skilled in the art that various changes and modifications may be made without departing from the broad principle of the invention which shall be limited only by the scope of the appended claims.

What is claimed is:
1. A fixture comprising:
a housing including an apertured cover plate;
a first plate disposed movably in said housing;
a second plate disposed movably in said housing, said second plate superposed on said first plate and having a coupling means extending through the aperture of said cover, said coupling means being of a smaller size than said aperture to provide for limited motion of said coupling means relative to said aperture;
first means for providing fluid under pressure in the space between said cover plate and said second plate and between said second plate and said first plate for enabling said second plate to undergo floating motion whereby to cause said coupling means to engage a workpiece in predetermined relation, and
second means for providing fluid under pressure in the space between said housing and said first plate for causing said first plate responsive to such pressurized fluid to be forced into contact with said second plate and said second plate into intimate contact with said cover plate for retaining the position of said coupling means in said predetermined relation with the workpiece.
2. A fixture comprising:
a housing having a cover plate with an aperture;
said housing with cover plate forming a cavity for enclosing therein a first and a second plate in superposed relation, each of said plates dimensioned for limited relative motion in said housing;
a pin secured to said second plate and extending from said plate through the aperture of said cover plate, said pin being of a smaller dimension than said aperture to enable said second plate to undergo limited motion relative to said housing;
first means for providing fluid under pressure in the space between said cover plate and said second plate and between said second plate and said first plate for enabling said second plate to undergo floating motion whereby to enable said coupling means to engage a workpiece in predetermined relation, and
second means for providing fluid under pressure in the space between said housing and said first plate for causing said first plate, responsive to the presence of said pressurized fluid, to be in forced superposed contact with said second plate and said second plate to be in forced superposed contact with said cover plate for retaining said coupling means in said predetermined relation with said workpiece.
3. A fixture as set forth in claim 2, and resilient means disposed between said first plate and said cover plate for urging said first plate away from said second plate and for establishing, when said second means is inoperative, a gap between said cover plate and said first plate, said gap being slightly larger than the thickness of said second plate.
4. A fixture as set forth in claim 3, and respective friction means interposed between said cover plate and said second plate and said second plate and said first plate.
5. A fixture as set forth in claim 3, said friction means being friction pads secured to said second plate.
6. A fixture as set forth in claim 2, said second means including an inflatable bladder disposed between said housing and said first plate.
7. A fixture as set forth in claim 2, said fluid comprising gas.
8. A fixture as set forth in claim 2, said first means including a bore in said second plate and grooves in the face surfaces of said plate, said grooves in communication with said bore for receiving and distributing said fluid across said face surfaces.

* * * * *